(12) United States Patent
Ito et al.

(10) Patent No.: US 7,237,935 B2
(45) Date of Patent: Jul. 3, 2007

(54) LIGHT SOURCE MODULE AND VEHICULAR LAMP

(75) Inventors: Masayasu Ito, Shizuoka (JP); Hitoshi Takeda, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 190 days.

(21) Appl. No.: 11/076,782

(22) Filed: Mar. 10, 2005

(65) Prior Publication Data

US 2005/0201115 A1 Sep. 15, 2005

(30) Foreign Application Priority Data

Mar. 12, 2004 (JP) ............................. 2004-071587

(51) Int. Cl.
*B60Q 1/00* (2006.01)
(52) U.S. Cl. ...................... 362/547; 362/507; 362/516; 362/520; 362/545
(58) Field of Classification Search ................ 362/487, 362/507, 516, 520, 538, 543–547
See application file for complete search history.

(56) References Cited

U.S. PATENT DOCUMENTS 6,218,785 B1 * 4/2001 Incerti .................... 315/185 S

FOREIGN PATENT DOCUMENTS

JP 03162029 A * 7/1991
JP 2002-231013 8/2002

OTHER PUBLICATIONS

Patent Abstracts of Japan, Publication No. 2002-231013 dated Aug. 16, 2002, 1 page.

* cited by examiner

*Primary Examiner*—Sandra O'Shea
*Assistant Examiner*—Jason Moon Han
(74) *Attorney, Agent, or Firm*—Osha Liang LLP

(57) ABSTRACT

A vehicular lamp has a plurality of light source modules for emitting light. Each of the light source modules has a semiconductor light-emitting element, a lighting circuit operable to control an electric current flowing into the semiconductor light-emitting element to turn the semiconductor light-emitting element on and off, a power cable operable to supply electric power from a power source located outside the vehicular lamp to the lighting circuit, a control cable operable to transmit a control signal that controls turning the semiconductor light-emitting element on and off to the lighting circuit, and a mounting substrate that mounts the semiconductor light-emitting element and the lighting circuit. One of the light source modules is connected to the power source by means of said power cable. The light source modules other than the one light source module are connected to the one light source module in parallel via the power cable.

7 Claims, 10 Drawing Sheets

FIG. 6
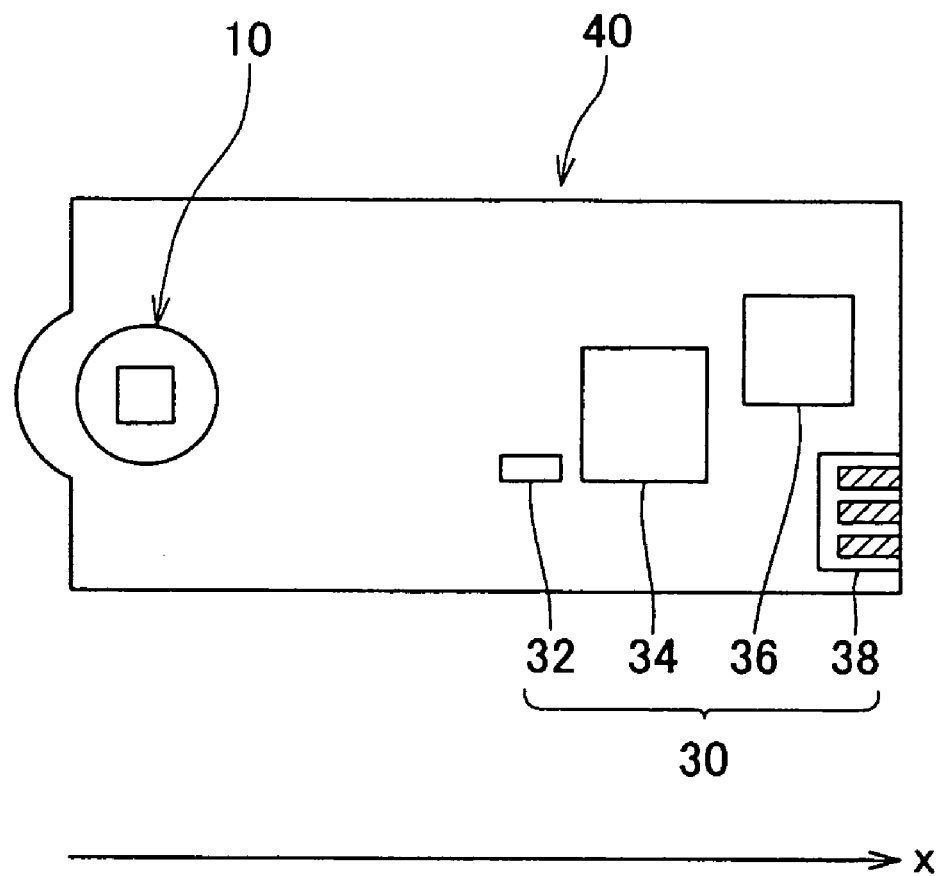
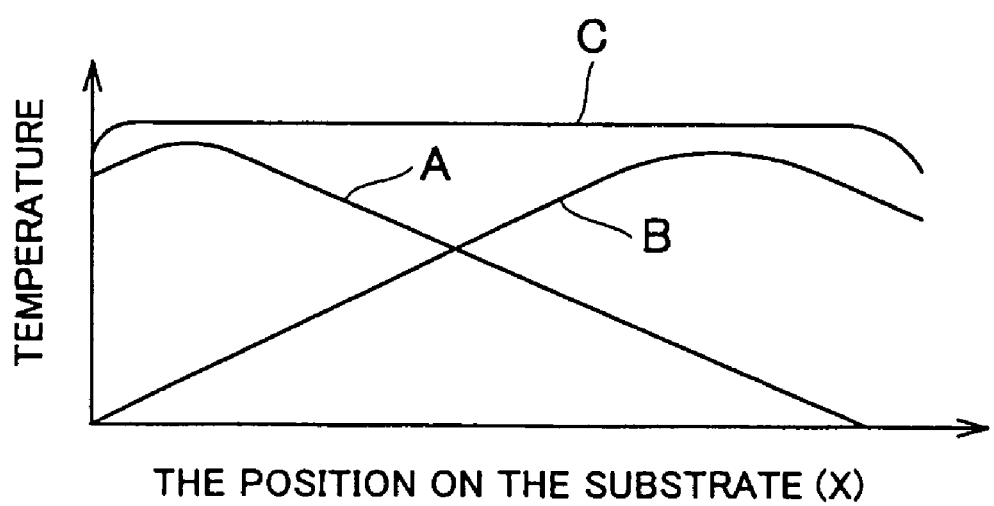
THE POSITION ON THE SUBSTRATE (X)

LIGHT SOURCE MODULE AND VEHICULAR LAMP

This patent application claims priority from a Japanese Patent Application No. 2004-071587 filed on Mar. 12, 2004, the contents of which are incorporated herein by reference.

BACKGROUND OF THE INVENTION

1. Field of the Invention

The present invention relates to a light source module and a vehicular lamp.

2. Description of Related Art

Conventionally, a vehicular lamp that uses a semiconductor light-emitting element is known as disclosed, for example, in Japanese Patent Laid-Open No. 2002-231013. In some cases, a vehicular lamp uses a plurality of semiconductor light-emitting elements to light each element individually, and thus various light distribution pattern can be formed.

In such a vehicular lamp, there was a problem that a circuit scale increases, e.g., to control each of the semiconductor light-emitting elements independently, in some cases. In this way, a cost of a vehicular lamp also increased in some cases.

SUMMARY OF THE INVENTION

Therefore, it is an object of the present invention to provide a light source module and a vehicular lamp that can solve the foregoing problems. The above and other objects can be achieved by combinations described in the independent claims. The dependent claims define further advantageous and exemplary combinations of the present invention.

According to the first aspect of the present invention, there is provided a vehicular lamp that is used for a vehicle. The vehicular lamp includes a plurality of light source modules for emitting light, in which each of the plurality of light source modules includes: a semiconductor light-emitting element; a lighting circuit operable to control an electric current flowing into the semiconductor light-emitting element to turn the semiconductor light-emitting element on and off; a power cable operable to supply electric power from a power source located in the outside of the vehicular lamp to the lighting circuit; a control cable operable to transmit a control signal that controls turning the semiconductor light-emitting element on and off to the lighting circuit; and a mounting substrate that mounts the semiconductor light-emitting element and the lighting circuit, one of the light source modules is connected to the power source by means of the power cable, and the light source modules other than the one light source module are connected to the one light source module in parallel via the power cable in the vehicular lamp.

The lighting circuit may include: a first component; and a second component, the mounting substrate may mount the first component and the second component, and the second component may have height higher than that of the first component on the mounting substrate and is mounted close to the semiconductor light-emitting element in comparison with the first component.

The mounting substrate may be formed of metals and mount the lighting circuit and the semiconductor light-emitting element on the same face. In this case, each of the plurality of light source modules may further include a sub-substrate that is formed of materials having thermal conductivity lower than that of the mounting substrate, mounts the lighting circuit, and is mounted on the mounting substrate along with the semiconductor light-emitting element mounted thereon on the same face.

The vehicular lamp may further include a reflecting mirror that is provided on a face on which the semiconductor light-emitting element is provided in order to reflect light emitted from the semiconductor light-emitting element, in which the lighting circuit may include a third component that is mounted on the mounting substrate, has height higher than that of the semiconductor light-emitting element on the basis of the mounting substrate, and is provided on the outside of optical path of light irradiated from the semiconductor light-emitting element to the reflecting mirror. In this case, the reflecting mirror may have an optical center on a light-emitting face of the semiconductor light-emitting element and reflect light emitted from the semiconductor light-emitting element toward a lateral direction of the mounting substrate.

According to the second aspect of the present invention, there is provided a light source module including: a semiconductor light-emitting element; a lighting circuit operable to control an electric current flowing into the semiconductor light-emitting element to turn the semiconductor light-emitting element on and off; and a mounting substrate that is formed of metals generally rectangular in shape and mounts the semiconductor light-emitting element in the vicinity of one end and the lighting circuit in the vicinity of another end.

The summary of the invention does not necessarily describe all necessary features of the present invention. The present invention may also be a sub-combination of the features described above.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which:

FIG. 6 is a view showing temperature distribution of a light source module according to one or more embodiments of the present invention.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
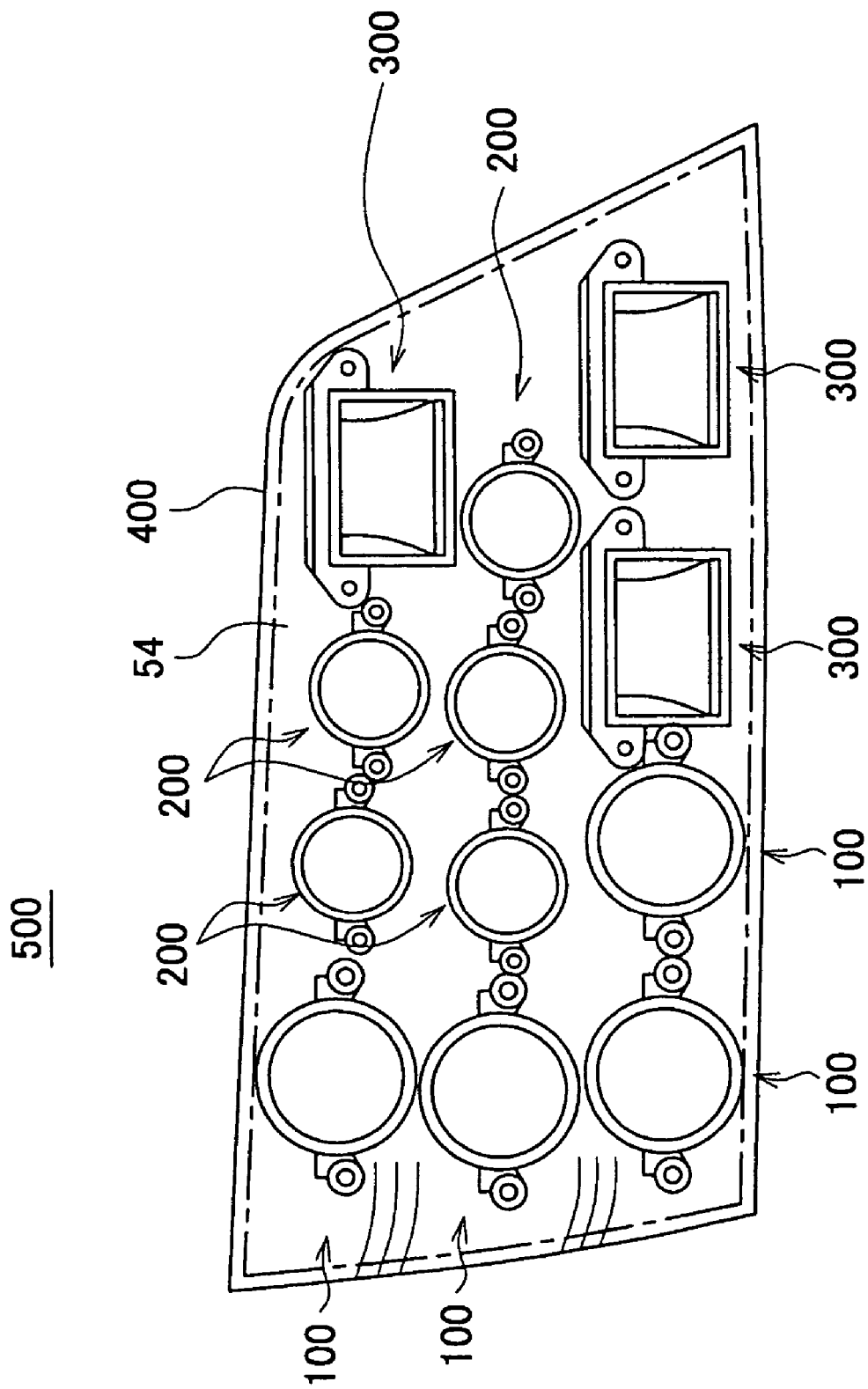
FIG. 1 is a front view of a vehicular lamp.
Figure 2:
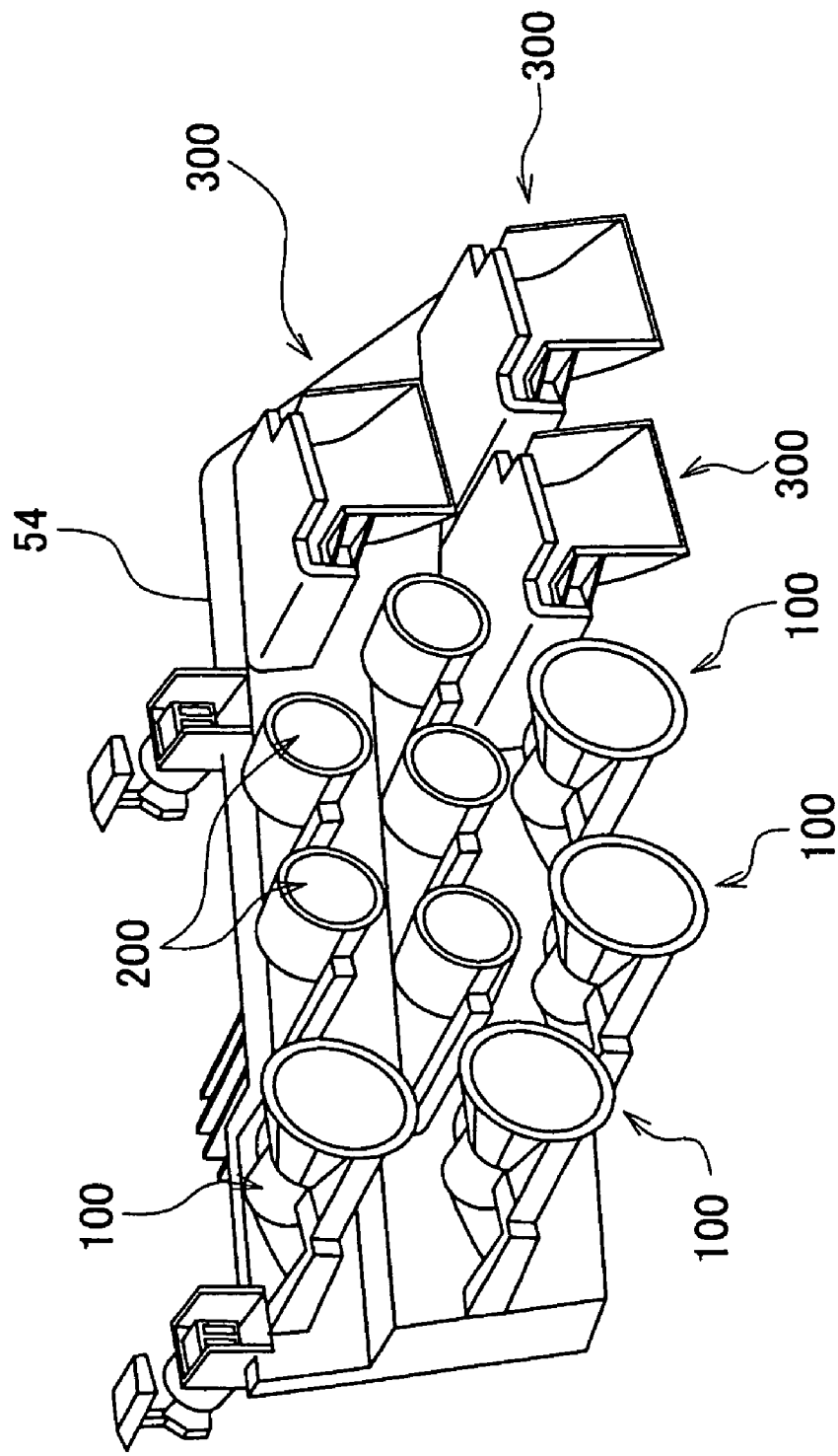
FIG. 2 is a perspective view of the vehicular lamp obliquely viewed from a front position.
Figure 3:
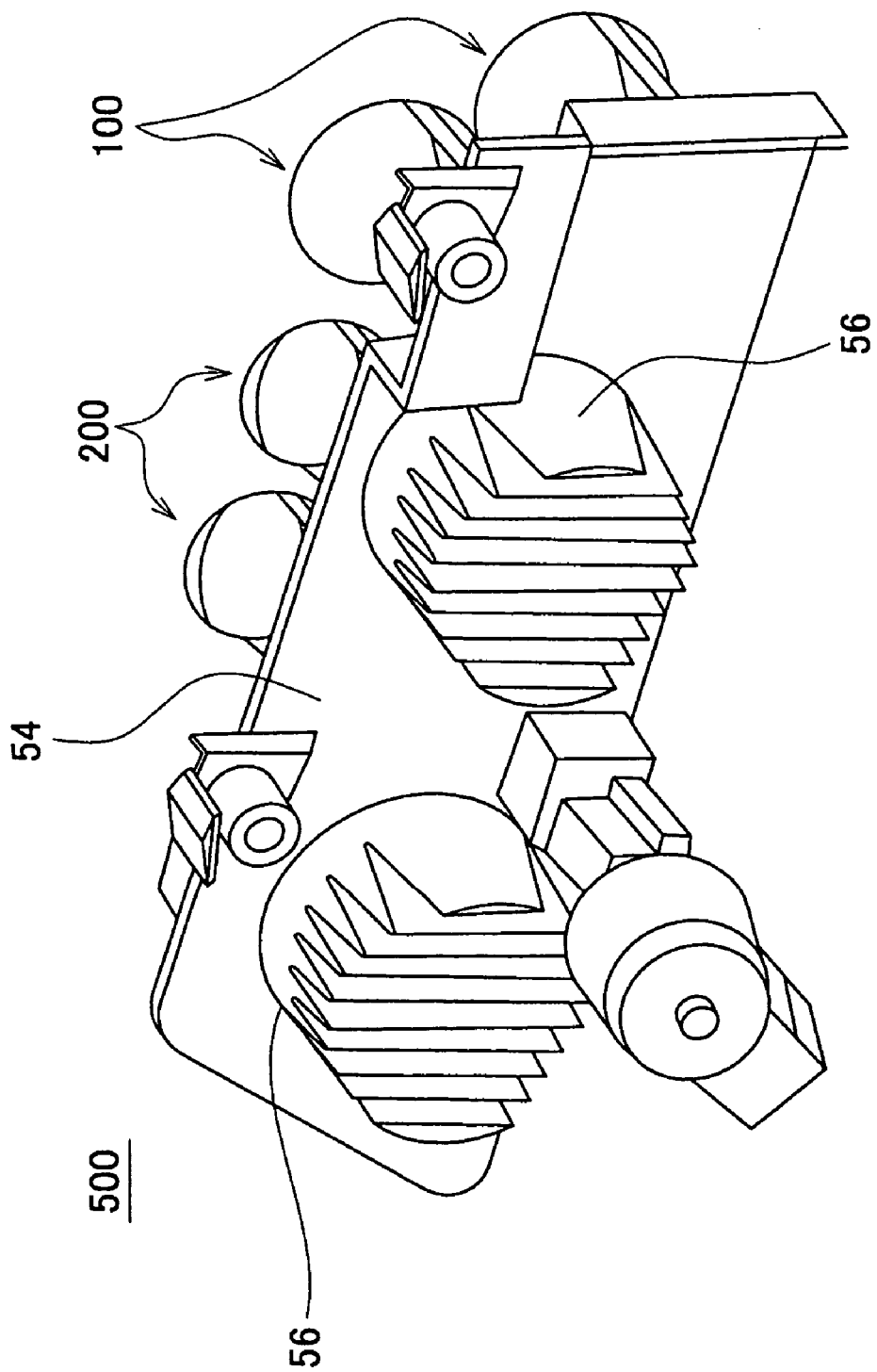
FIG. 3 is a perspective view of the vehicular lamp obliquely viewed from a rear position.

FIGS. 1 to 3 are views showing a configuration of a vehicular lamp 500 according to an embodiment of the present invention. FIG. 1 is a front view of the vehicular lamp 500. FIG. 2 is a perspective view of the vehicular lamp 500 obliquely viewed from a front position when a transparent cover 400 shown in FIG. 1 has been detached. FIG. 3 is a perspective view of the vehicular lamp 500 shown in FIG. 2 obliquely viewed from a rear position. The object of the present embodiment is to provide the vehicular lamp 500 that can be miniaturized and can efficiently radiate heat of a light source provided in the vehicular lamp 500. In addition, back and forth, left and right, and up and down described in the present embodiment are respectively corresponding to back and forth, left and right, and up and down of a vehicle.

The vehicular lamp 500 is, e.g., a headlamp for low-beam irradiation that is used for a vehicle, and accommodates a plurality of light source units within a light chamber composed of a transparent cover 400 and a bracket 54. The light source units are classified into first light source units 100 having comparatively large diameter and round shape, second light source units 200 having comparatively small diameter and round shape, and third light source units 300 having horizontally long and angular shape. Each of the light source units has a light-emitting diode element described below as a light source, and irradiates light emitted from the light-emitting diode element ahead of a vehicle. The light-emitting diode element is an example of a semiconductor light-emitting element of the present invention. The semiconductor light-emitting element may be, e.g., a laser diode other than a light-emitting diode element.

The light source units are attached to the bracket 54 so that they incline to the lower side by 0.5 to 0.6° with respect to the front of a vehicle. The bracket 54 is attached to the vehicular lamp 500 so that it can be inclined by an aiming mechanism that adjusts a direction of an optical axis of the light source unit. Each of the light source units irradiates some area of a light distribution pattern according to their types, and forms a light distribution pattern required in the vehicular lamp 500 as a whole.

A plurality of heat sinks 56 is provided in the rear face of the bracket 54. The heat sink 56 is formed of a material having higher thermal conductivity than that of resin such as metal or ceramic, and absorbs and radiates heat emitted from the plurality of light source units.

Figure 4:
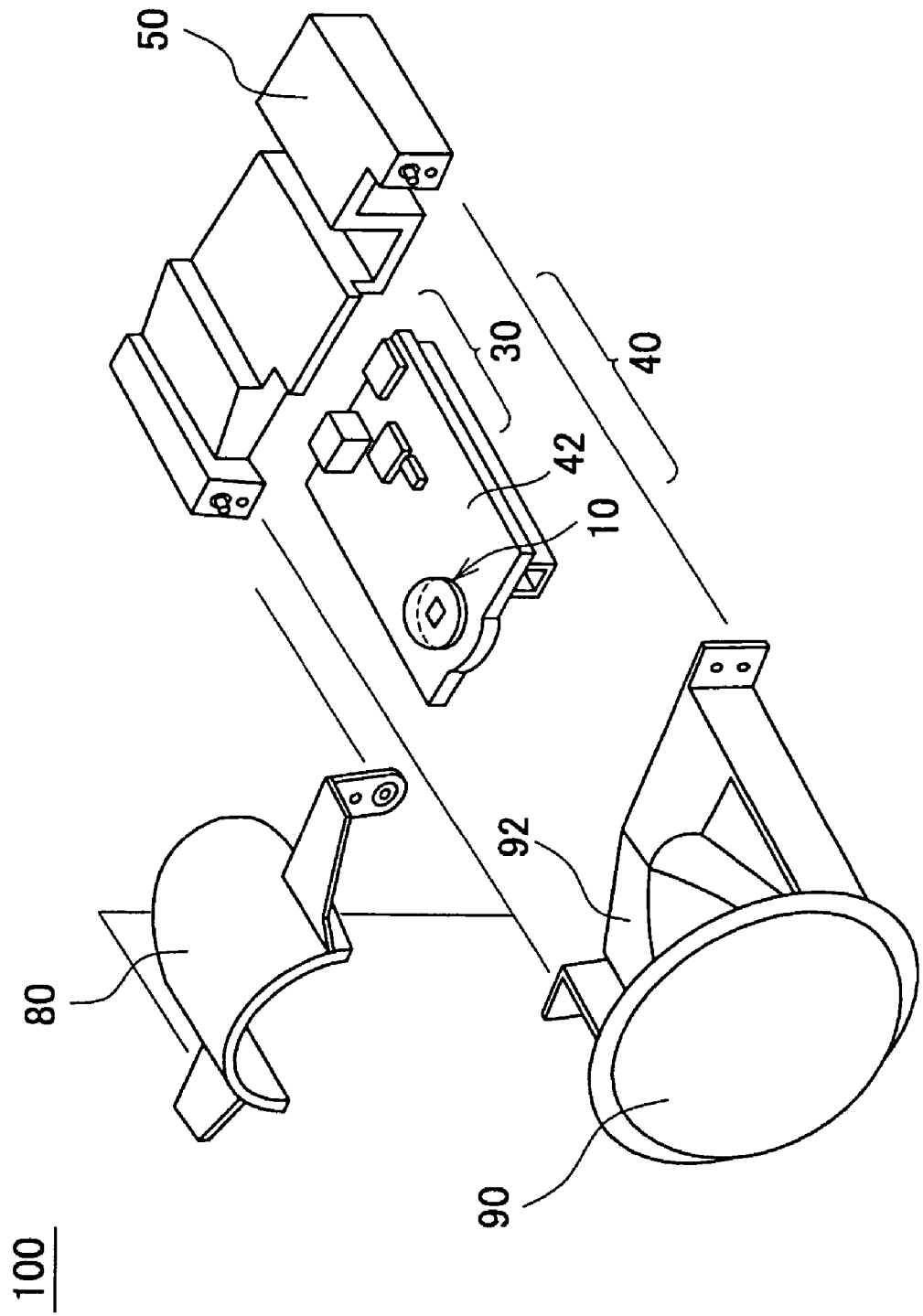
FIG. 4 is an exploded perspective view of a first light source unit.

FIG. 4 is an exploded perspective view of the first light source unit 100. The first light source unit 100 is composed to intensively irradiate a central area having relatively narrow width among a light distribution pattern of the vehicular lamp 500. The first light source unit 100 includes a light source module 40, a pedestal 50, a reflecting mirror 80, and a lens 90. The light source module 40 includes a light source section 10, a lighting circuit 30, and a metal substrate 42. The light source section 10 has a light-emitting diode element 14 therein, and emits light depending on electric power being received. The lighting circuit 30 controls a current flowing into the light source section 10 according to a control signal received from the outside of the vehicular lamp 500 based on power received from the outside of the vehicular lamp 500 in order to turn the light source section 10 on and off. The metal substrate 42 that is an example of a mounting substrate in the present invention is formed by covering generally rectangular metal with an insulating layer and has high thermal conductivity. In addition, the metal substrate 42 mounts the lighting circuit 30 and the light source section 10 on the same face.

The pedestal 50 mounts the light source module 40, and also fixes the reflecting mirror 80 and the lens 90 as against the light source module 40. It is preferable that the pedestal 50 is formed of a material having higher thermal conductivity than that of resin such as metal or ceramic. The reflecting mirror 80 is generally domy member that is fixed to the upper side of the light-emitting diode element 14 of the light source section 10, and has a reflecting face having generally ellipsoidal sphere that has an optical axis of the first light source unit 100 as a central axis therein. Particularly, the reflecting face is formed so that a cross section including the optical axis of the first light source unit 100 becomes generally ellipsoidal shape of ¼ that uses one point away from the rear of the light source section 10 as a common vertex. By such a shape, the reflecting mirror 80 directs light emitted from the light source section 10 toward the front to condense and reflect the light on an optical axis side of the lens 90. The lens 90 includes a shade 92 in the light source module 40 side. The shade 92 shields or reflects a part of light reflected by the reflecting mirror 80 to cause a ray of light forming a light distribution pattern of the first light source unit 100 to be incident on the lens 90. The lens 90 projects light reflected by the reflecting mirror 80 ahead of the vehicular lamp 500.

Here, since the metal substrate 42 is formed of a material having high thermal conductivity and mounts the lighting circuit 30 and the light source section 10 that is turned by the lighting circuit 30 on and off on the same face, heat generated from the light source section 10 can be conducted from the rear face of the metal substrate 42, on which the light source section 10 and the lighting circuit 30 are mounted, to the pedestal 50, and then can be conducted to the heat sink 56 that is provided in a back face of the first light source unit 100. Therefore, the metal substrate 42 can efficiently radiate heat generated from the light source section 10.

Figure 5A:
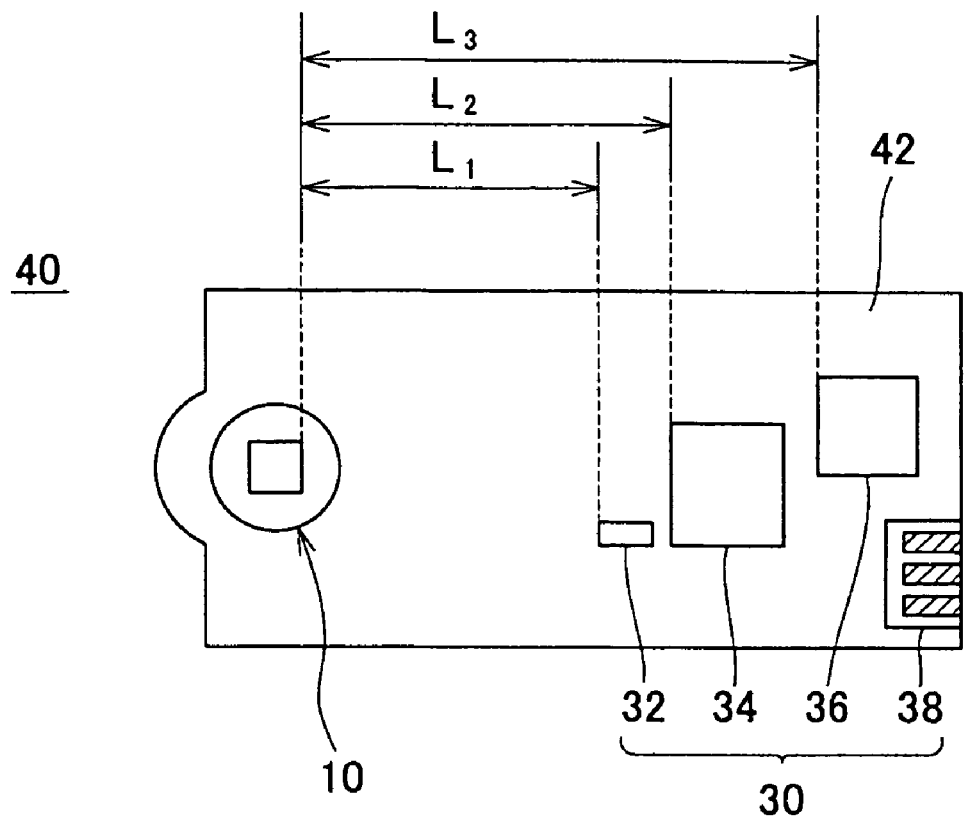
FIGS. 5A and 5B are views showing a detailed configuration of a light source module according to one or more embodiments of the present invention.
Figure 5B:
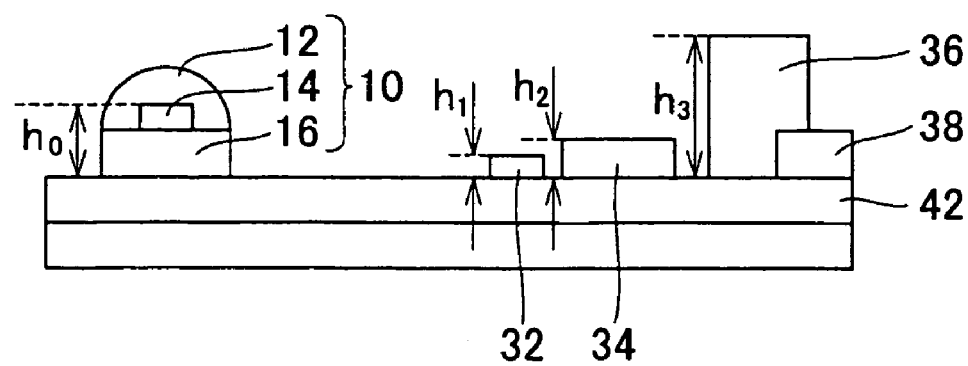

FIGS. 5A and 5B are views showing a detailed configuration of the light source module 40 according to one or more embodiments of the present invention. FIG. 5A shows a top view of the light source module 40. FIG. 5B shows a side view of the light source module 40. The metal substrate 42 is a plate-like body having generally rectangular shape and mounts the light source section 10 in the vicinity of one end and the lighting circuit 30 in the vicinity of another end. The light source section 10 has a mold 12 and a heat dissipation substrate 16 in addition to the light-emitting diode element 14. The heat dissipation substrate 16 puts the mold 12 and the light-emitting diode element 14 thereon, and conducts heat generated from the light-emitting diode element 14 to the metal substrate 42. The mold 12 is formed of a light transmittance material in the shape of a hemisphere, and seals the light-emitting diode element 14.

The lightning circuit 30 includes a lighting circuit component 32, a lighting circuit component 34, a lighting circuit component 36, and a connector 38. The connector 38 receives electric power supplied from the outside of the light source module 40 to the lighting circuit 30. The lighting circuit component 32 is mounted on the position away from the light-emitting diode element 14 by $L_1$ on the metal substrate 42, and has the height of $h_1$. The lighting circuit component 34 is mounted on the position away from the light-emitting diode element 14 by $L_2$ farther than $L_1$ on the metal substrate 42, and has the height of $h_2$ higher than $h_1$. The lighting circuit component 36 is mounted on the position away from the light-emitting diode element 14 by $L_3$ on the metal substrate 42, and has the height of $h_3$ higher than $h_0$ that is the height from the metal substrate 42 to the light-emitting diode element 14. In addition, it is preferable that the distance $L_3$ between the light-emitting diode element 14 and the lighting circuit component 36 is, e.g., not less than 5 mm.

In this way, since the component having low height is mounted closer to the light-emitting diode element 14, a ratio by which light emitted from the light-emitting diode element 14 is blocked by the lighting circuit 30 can be reduced. Therefore, it is possible to efficiently irradiate light emitted from the light-emitting diode element 14 toward the outside of the light source module 40.

In addition, although the light source module 40 has one light source section 10 in this example, the light source module 40 may have a plurality of light source units 10 in another example. Further, although the light source section 10 has one light-emitting diode element 14 in this example, the light source section 10 may have a plurality of light-emitting diode elements 14 in another example. Moreover, the lighting circuit component 32 is an example of the second component in the present invention, the lighting circuit component 34 is an example of the first component in the present invention, and the lighting circuit component 36 is an example of the third component in the present invention.

FIG. 6 is a view showing temperature distribution of the light source module 40 according to one or more embodiments of the present invention. When the light source section 10 is lighted, since heat generated from the light source section 10 is conducted to the metal substrate 42, the light source section 10 forms temperature distribution as shown by A, in which temperature becomes as low as the metal substrate 42 departs from the light source section 10. In addition, when the lighting circuit 30 lights the light source section 10, a transistor or the like of the lighting circuit 30 generates heat. Therefore, the lighting circuit 30 forms temperature distribution as shown by B, in which temperature becomes as low as the metal substrate 42 departs from the lighting circuit 30. In this way, the light source section 10 and the lighting circuit 30 form temperature distribution as shown by C on the metal substrate 42.

Here, assuming that the light source section 10 and the lighting circuit 30 are arranged close to each other on the metal substrate 42, when the light source section 10 is lighted, the light source section 10 may further be heated in some cases due to heat generated from the lighting circuit 30 in addition to heat generated from the light-emitting diode element 14 of the light source section 10. In this case, a temperature difference between ambient air and the light source section 10 becomes higher than a temperature rise by only the light-emitting diode element 14.

However, in this example, since the light source section 10 and the lighting circuit 30 are respectively mounted on one end and another end of the light source module 40, a ration by which heat generated from the lighting circuit 30 is transmitted to the light source section 10 is low. Therefore, a temperature rise of the light source section 10 becomes small in comparison with closely spacing the light source section 10 and the lighting circuit 30, and thus a temperature difference between ambient air and the light source section 10 becomes low. In this way, luminous efficiency of the light-emitting diode element 14 becomes high in comparison with closely spacing the light source section 10 and the lighting circuit 30. Therefore, it is possible to prevent degradation of a light amount of the light source section 10 by yellow discoloration of the mold 12 of the light source section 10. Furthermore, since a ration by which heat generated from the light-emitting diode element 14 is transmitted to the lighting circuit 30 becomes small, it is possible to use a cheap component, of which characteristics are greatly varied according to a temperature change, in the lighting circuit 30.

Figure 7:
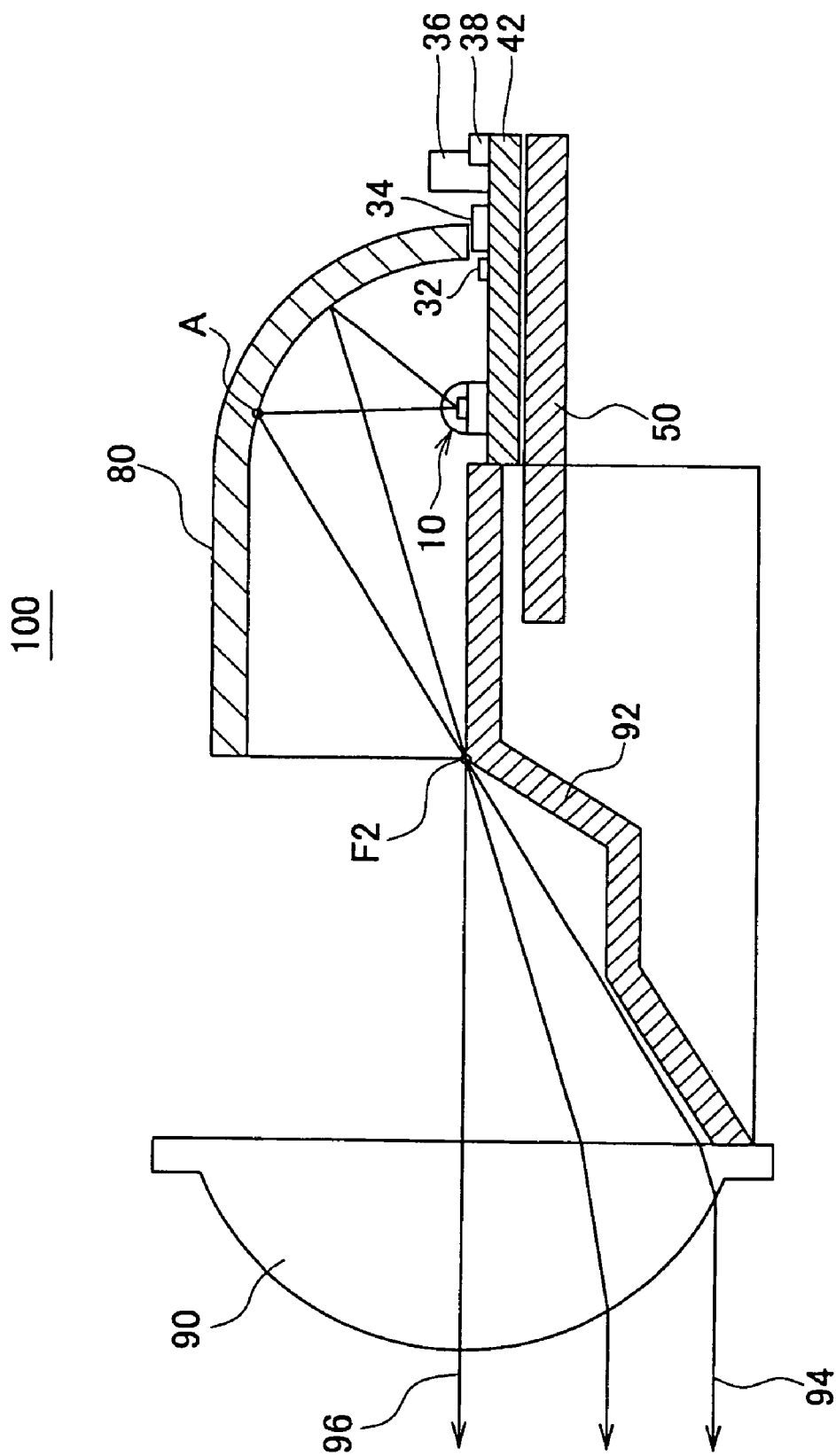
FIG. 7 is a sectional view showing an optical path of the first light source unit according to one or more embodiments of the present invention.

FIG. 7 is a sectional view showing an optical path of the first light source unit 100 according to one or more embodiments of the present invention. The reflecting mirror 80 is provided in the face side on which the light source section 10 of the metal substrate 42 is mounted. The reflecting face formed in the inside of the reflecting mirror 80 is formed in the generally ellipsoidal shape in its cross section including an optical axis of the lens 90, and an eccentricity of the reflecting face is set to gradually become large from vertical cross section toward horizontal cross section. The reflecting mirror 80 has an optical center on a light-emitting face of the light-emitting diode element 14. In this way, the reflecting mirror 80 irradiates light emitted from the light-emitting diode element 14 toward the lateral side of the metal substrate 42. In vertical cross section including an optical axis of the lens 90, the lens 90 is provided to match a backward side focal position F2 to a focal position of the reflecting face of the reflecting mirror 80.

The reflecting mirror 80 focuses light on F2. The light is emitted from the light source section 10 and is reflected from a reflecting face more backward than a reflecting point A of a ray of light 94 that passes F2 and then is incident on a bottom end of the lens 90. The ray of light 94 is projected on a downside border of a light distribution pattern of the light source unit 100.

On the other hand, a ray of light 96 along the optical axis of the lens 90 is projected on a topside border of a light distribution pattern of the light source unit 100. The edge that sinks from F2 toward the bottom is formed in the shade 92 that is integrally provided along with the lens 90. In this way, an optical image that is formed by the edge of the shade 92 and the reflecting mirror 80 on a focal plane including F2 is inverted by the lens 90 and is projected ahead.

On the other hand, a focal point of the reflecting mirror 80 in the horizontal direction is provided in the lens 90 side rather than F2. The edge of the shade 92 including F2 is formed so that both sides seen from the top face have a forward curvature corresponding to a curved field of the reflecting mirror 80, i.e., a curvature of a focal plane in the right and left direction. Therefore, an optical image that is focused on an edge more forward than F2 by reflection of the reflecting mirror 80 is magnified by the lens 90 in the right and left direction to be inverted and projected.

Here, the lightning circuit component 36 is provided in the outside of optical path of light that is irradiated from the light-emitting diode element 14 to the reflecting mirror 80, and the height of the lightning circuit component 36 is higher than that of the light-emitting diode element 14 in reference to the metal substrate 42. In this way, the lighting circuit component 36 does not obstruct light that is irradiated from the light-emitting diode element 14 to the reflecting mirror 80. Therefore, light emitted from the light-emitting diode element 14 can efficiently be irradiated to the outside of the first light source unit 100 via the reflecting mirror 80 and the lens 90.

Figure 8:
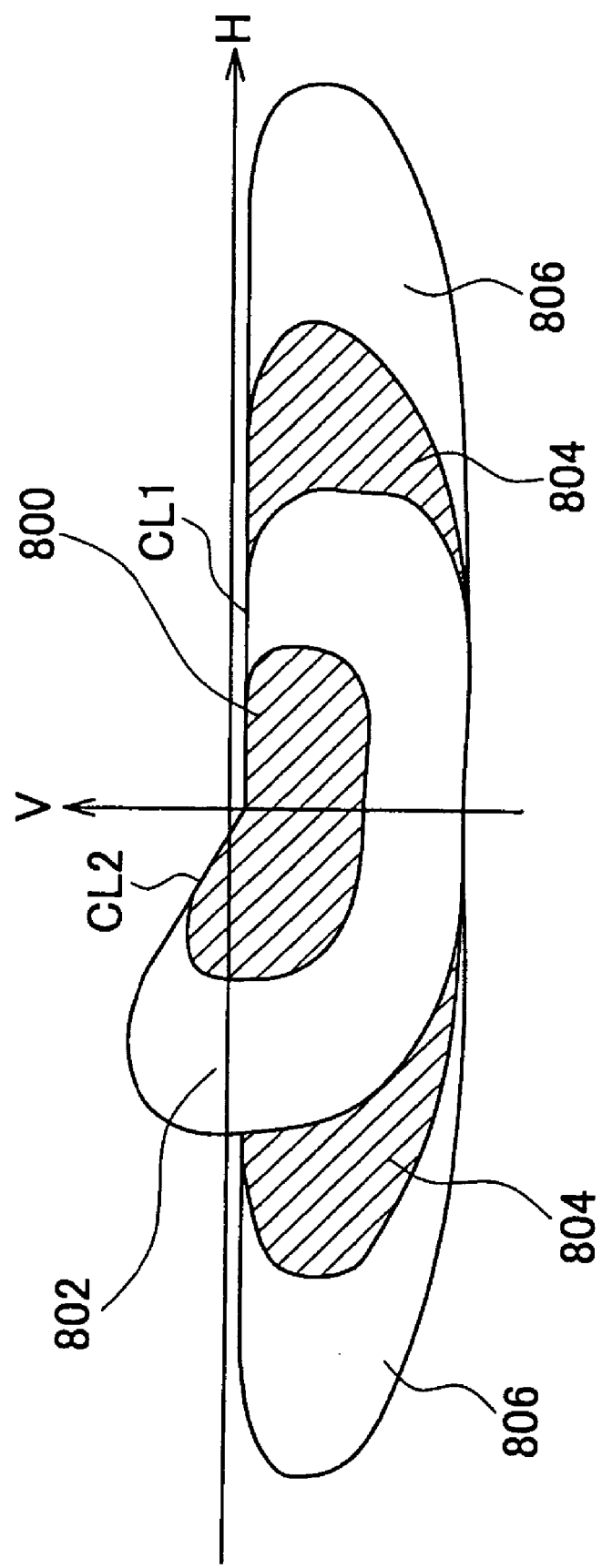
FIG. 8 is a view showing a light distribution pattern of the vehicular lamp according to one or more embodiments of the present invention.

FIG. 8 is a view showing a light distribution pattern of the vehicular lamp 500 according to one or more embodiments of the present invention. The light distribution pattern is a left low-beam light distribution pattern formed on a virtual vertical screen disposed in the position of 25 m from the vehicular lamp 500. The light distribution pattern is formed by composition of the first light distribution pattern 800 formed by the light source unit 100, the second light distribution pattern 802 and the third light distribution pattern 804 formed by the second light source unit 200, and the fourth light distribution pattern 806 formed by the third light source unit 300. The light distribution pattern has a horizontal cut line CL1 and an oblique cut line CL2 that define a boundary between the bright and dark in the up and down direction in its upper end.

The horizontal cut line CL1 is set on the lower side somewhat (downward about 0.5 to 0.6°) in reference to the front face (an intersecting point of the horizontal axis H and the vertical axis V) of the vehicular lamp 500. The oblique cut line CL2 inclines by about 15° from an intersecting point of the vertical axis V and CL1 toward top left. The horizontal cut line CL1 among the first light distribution pattern 800 is formed by a horizontal edge of the shade 92, and the oblique cut line CL2 is formed by an oblique edge of the shade 92. The vehicular lamp 500 can get visibility to a road surface in front of a vehicle by such a light distribution pattern.

Figure 9:
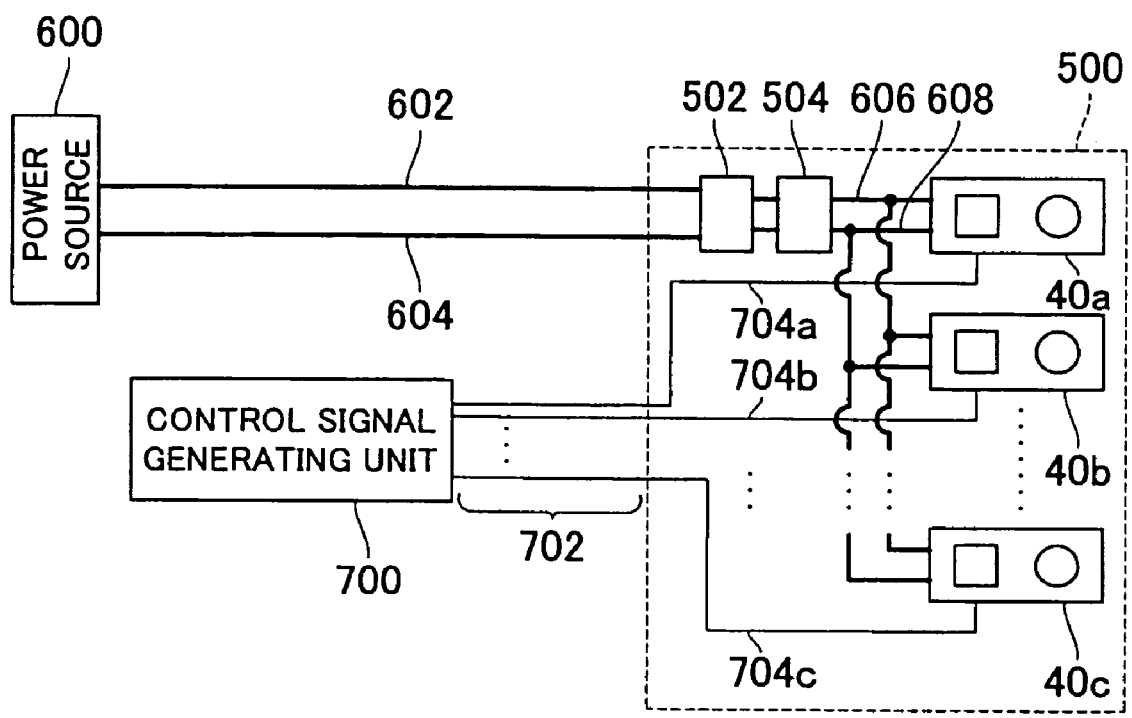
FIG. 9 is a view showing a connection between the vehicular lamp, a power source, and a control signal generating unit according to one or more embodiments of the present invention.

FIG. 9 is a view showing a connection between the vehicular lamp 500, a power source 600, and a control signal generating unit 700 according to one or more embodiments of the present invention. The power source 600 and the control signal generating unit 700 are provided in the outside of the vehicular lamp 500. The power source 600 is, e.g., a battery of the vehicle, and supplies electric power to the vehicular lamp 500 via the power cables 602 and 604. The control signal generating unit 700 supplies a control signal, which turns on and off each of a plurality of light source modules 40a, 40b, and 40c included in the vehicular lamp 500, to the vehicular lamp 500 via a flat cable 702.

The vehicular lamp 500 further has a protection circuit 502 and a filter circuit 504. The protection circuit 502 is, e.g., a diode element, and does not stream an electric current into the vehicular lamp 500 to protect the vehicular lamp 500 when a reverse voltage is applied to the vehicular lamp 500. The filter circuit 504 is, e.g., a π-type circuit by a coil and a condenser, and removes high frequency component of electric power that leaks to the power source 600 or electric power that is supplied from the power source 600. After the power from the power source 600 passes through the protection circuit 502 and the filter circuit 504, the power from the power source 600 is supplied to the lighting circuit 30 of each of the light source modules 40a, 40b, and 40c via power cables 606 and 608. One light source module 40a is connected to the power source 600 by means of the power cables 606 and 608. The light source modules 40b and 40c are connected to the light source module 40a in parallel via the power cables 606 and 608 within the vehicular lamp 500. In addition, the protection circuit 502 and the filter circuit 504 may be provided in a socket of the vehicular lamp 500 that is provided in a vehicle, or may be mounted on a dedicated substrate that is provided in the vehicular lamp 500.

The flat cable 702 has a plurality of control cables 704a, 704b, and 704c. Each of the control cables 704a, 704b, and 704c is provided corresponding to each of the light source modules 40, and transmits a control signal that controls turning the light-emitting diode element 14 on and off to the corresponding lighting circuit 30. In addition, an electric current flowing into each of the control cables 704a, 704b, and 704c is smaller than that flowing into each of the plurality of power cables 602, 604, 606, and 608. Therefore, each of the control cables 704a, 704b, and 704c is thinner than each of the plurality of power cables 602, 604, 606, and 608. Furthermore, for example, when the light source modules 40a and 40b are turned on and off simultaneously, the control cables 704a and 704b may be integrated. In other words, the number of control cables connected to the vehicular lamp 500 may be smaller than that of light source modules.

Here, assuming that the lighting circuit 30 is in the outside of the vehicular lamp 500, it is necessary that the vehicular lamp 500 is provided with a cable for supplying an electric current to the light source section 10. In addition, when individually turning the plurality of light source sections 10 on and off, the vehicular lamp 500 requires cables corresponding to the number of the light source sections 10 that are individually turned on and off. Furthermore, since an electric current flowing into the cables connected to each of the light source sections 10 is larger than that flowing into the control cables 704, it is necessary that the cables are thicker than the control cables 704. Therefore, it is difficult to miniaturize the vehicular lamp 500 in some cases. However, in this example, it is preferable that the two power cables 602 and 604 and the flat cable 702 are connected to the vehicular lamp 500. Therefore, since the number of cables connected to the vehicular lamp 500 can be reduced, it is possible to miniaturize the vehicular lamp 500.

Figure 10:
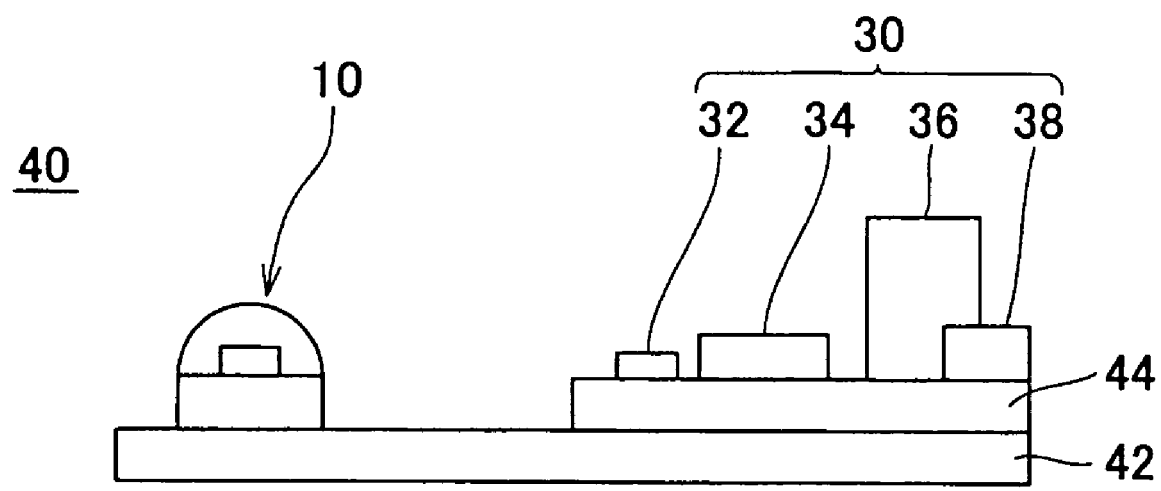
FIG. 10 is a view showing another example of a configuration of the light source module according to one or more embodiments of the present invention.

FIG. 10 is a view showing another example of a configuration of the light source module 40 according to one or more embodiments of the present invention. In addition, since the components of FIG. 10 having the same reference numbers as those of FIG. 5 have the same or similar functions as or to those of FIG. 5, their descriptions will be omitted. The light source module 40 further includes a sub-substrate 44. The sub-substrate 44 is formed of a material having thermal conductivity lower than that of the metal substrate 42. The sub-substrate 44 mounts the lighting circuit 30 and is mounted on the metal substrate 42 along with the light source section 10 mounted thereon on the same face. In this way, it is hard that the lighting circuit 30 is heated by heat generated from the light-emitting diode element 14 of the light source section 10. Therefore, although a component of which characteristics are varied according to a temperature change is used in the lighting circuit 30, the lighting circuit 30 can suitably turn the light-emitting diode element 14 on and off.

As is apparent from the above description, according to the present embodiment, it is possible to provide the vehicular lamp 500 that can be miniaturized and also can efficiently radiate heat generated from the light-emitting diode element 14.

Although the present invention has been described by way of exemplary embodiments, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A vehicular lamp that is used for a vehicle, comprising a plurality of light source modules for emitting light, wherein each of said plurality of light source modules comprises:
    a semiconductor light-emitting element;
    a lighting circuit operable to control an electric current flowing into said semiconductor light-emitting element to turn said semiconductor light-emitting element on and off;
    a power cable operable to supply electric power from a power source located in the outside of the vehicular lamp to said lighting circuit;

a control cable operable to transmit a control signal that controls turning said semiconductor light-emitting element on and off to said lighting circuit; and a mounting substrate that mounts said semiconductor light-emitting element and said lighting circuit, wherein one of said light source modules is connected to the power source by means of said power cable, and the light source modules other than said one light source module are connected to said one light source module in parallel via said power cable in the vehicular lamp.

2. The vehicular lamp as claimed in claim 1, wherein said lighting circuit comprises:

a first component; and a second component, wherein said mounting substrate mounts said first component and said second component, and said second component has height lower than that of said first component on said mounting substrate and is mounted close to said semiconductor light-emitting element in comparison with said first component.

3. The vehicular lamp as claimed in claim 1, wherein said mounting substrate is formed of metals and mounts said lighting circuit and said semiconductor light-emitting element on the same face.

4. The vehicular lamp as claimed in claim 3, wherein each of said plurality of light source modules further comprises a sub-substrate that is formed of materials having thermal conductivity lower than that of said mounting substrate, mounts said lighting circuit, and is mounted on said mounting substrate along with said semiconductor light-emitting element mounted thereon on the same face.

5. The vehicular lamp as claimed in claim 2, further comprising a reflecting mirror that is provided on a face on which said semiconductor light-emitting element is provided in order to reflect light emitted from said semiconductor light-emitting element, wherein said lighting circuit comprises a third component that is mounted on said mounting substrate, has height higher than that of said semiconductor light-emitting element on the basis of said mounting substrate, and is provided on the outside of optical path of light irradiated from said semiconductor light-emitting element to said reflecting mirror.

6. The vehicular lamp as claimed in claim 5, wherein said reflecting mirror has an optical center on a light-emitting face of said semiconductor light-emitting element and reflects light emitted from said semiconductor light-emitting element toward a lateral direction of said mounting substrate.

7. A light source module for use in a vehicular lamp comprising a pedestal connected to a heat sink, comprising:

a semiconductor light-emitting element mounted in the vehicular lamp;

a lighting circuit operable to control an electric current flowing into said semiconductor light-emitting element to turn said semiconductor light-emitting element on and off; and a mounting substrate that is mounted on the pedestal and formed of metals generally rectangular in shape and mounts said semiconductor light-emitting element in the vicinity of one end and said lighting circuit in the vicinity of another end, wherein heat generated by the semiconductor light-emitting element is conducted through the pedestal to the heat sink.

* * * * *